US011951627B2

United States Patent
Hong et al.

(10) Patent No.: US 11,951,627 B2
(45) Date of Patent: Apr. 9, 2024

(54) MODULAR AUTONOMOUS ROBOT DISTRIBUTED CONTROL

(71) Applicant: Ford Global Technologies, LLC, Dearborn, MI (US)

(72) Inventors: Sanghyun Hong, Ann Arbor, MI (US); Yifan Chen, Ann Arbor, MI (US); Raj Sohmshetty, Canton, MI (US); Smruti Panigrahi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 17/540,946

(22) Filed: Dec. 2, 2021

(65) Prior Publication Data
US 2023/0173675 A1    Jun. 8, 2023

(51) Int. Cl.
*B25J 11/00*    (2006.01)
*B25J 9/08*    (2006.01)
(Continued)

(52) U.S. Cl.
CPC ............ *B25J 9/1664* (2013.01); *B25J 9/08* (2013.01); *B25J 9/1045* (2013.01); *B25J 9/162* (2013.01);
(Continued)

(58) Field of Classification Search
CPC . B25J 9/1664; B25J 9/08; B25J 9/1045; B25J 9/162; B25J 9/1638; B25J 9/1651;
(Continued)

(56) References Cited

U.S. PATENT DOCUMENTS 9,588,519 B2 * 3/2017 Stubbs ................ G05D 1/0214
10,065,811 B2    9/2018 McCarthy et al.
(Continued)

FOREIGN PATENT DOCUMENTS

| CN | 111801717 A | * | 10/2020 | ........... G05D 1/0212 |
| EP | 3771955 B1 | * | 5/2022 | ....... G05B 19/41895 |
| WO | 2016033172 A1 | | 3/2016 | |

OTHER PUBLICATIONS

Anders Green "Designing and Evaluating Human-Robot Communication" (2009).

*Primary Examiner* — Adam R Mott
*Assistant Examiner* — Heather J Keniry
(74) *Attorney, Agent, or Firm* — Brandon Hicks; Eversheds Sutherland (US) LLP

(57) ABSTRACT

A distributed control system for an autonomous modular robot (AMR) vehicle includes a top module processor disposed in communication with a lower module processor, and memory for storing executable instructions of the top module processor and the lower module processor. The instructions are executable to cause the top module processor and the lower module processor to navigate a bottom module, via the bottom module processor, the AMR vehicle to a target destination. The instructions are further executable to determine, via the bottom module processor, that the AMR vehicle is localized at a target destination, transmit a request for a cargo unloading instruction set, and receive, via a top module processor, a response to a cargo unloading instruction set sent from the bottom module processor. The instructions further cause the top module processor to unload the cargo to a target destination surface via an unloading mechanism associated with the top module.

12 Claims, 7 Drawing Sheets

(51) Int. Cl.
*B25J 9/10* (2006.01)
*B25J 9/16* (2006.01)
*G05D 1/00* (2006.01)

(52) U.S. Cl.
CPC .......... *B25J 9/1638* (2013.01); *B25J 9/1651* (2013.01); *B25J 11/008* (2013.01)

(58) Field of Classification Search
CPC .......... B25J 11/008; G05D 2201/0216; G05D 1/0278
See application file for complete search history.

(56) References Cited

U.S. PATENT DOCUMENTS

| | | | | |
|---|---|---|---|---|
| 11,046,562 | B2* | 6/2021 | High | G06Q 10/30 |
| 11,161,245 | B2* | 11/2021 | Kushner | B25J 13/006 |
| 11,173,605 | B2* | 11/2021 | Kim | B25J 9/1666 |
| 2013/0325032 | A1* | 12/2013 | Schena | A61B 34/37 |
| | | | | 606/130 |
| 2019/0033868 | A1* | 1/2019 | Ferguson | G06Q 10/0835 |
| 2019/0287063 | A1* | 9/2019 | Skaaksrud | G08G 1/202 |
| 2020/0349789 | A1* | 11/2020 | Kim | H04W 12/63 |
| 2021/0089040 | A1 | 3/2021 | Ebrahimi Afrouzi et al. | |
| 2021/0107159 | A1* | 4/2021 | Goto | B25J 9/1664 |
| 2021/0330119 | A1* | 10/2021 | Väin | G07F 13/065 |

\* cited by examiner

MODULAR AUTONOMOUS ROBOT DISTRIBUTED CONTROL

TECHNICAL FIELD

The present disclosure relates to autonomous robotics, and more particularly, to a distributed robot control system for a modular autonomous robot delivery vehicle.

BACKGROUND

The rise of autonomy and robots in the package delivery business is a growing business trend. The advantage of robotic package delivery is that one can minimize downtime and optimize operational efficiency. Robots can perform delivery at odd hours, such as at night, while humans sleep. The nighttime operation will also be more efficient due to less vehicular traffic, which will greatly improve the speed of the delivery.

Technologies disrupting the transportation ecosystem currently include self-driving cars and trucks and the shared economy. While these technologies may cover long travel miles, they are not directly affecting the last-mile delivery, which is likely the bottleneck for a product's journey between manufacturer and the end customer. With the proliferation of e-commerce, many brands increasingly look for opportunities to sell directly to customers. This fact will escalate last-mile logistics challenges. Customers desire a seamless shopping experience with fast, convenient delivery. From the e-commerce supply side, increased service requirements and greater supply chain complexity will lead to higher costs for logistics.

Most mobile delivery robots are purpose-built and lack the flexibility to perform well in a changing environment. Robots can be used to deliver goods without human involvement, but are limited in their ability to manage a wide variety of payload sizes, configurations, and environmental conditions in a single delivery robot chassis.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
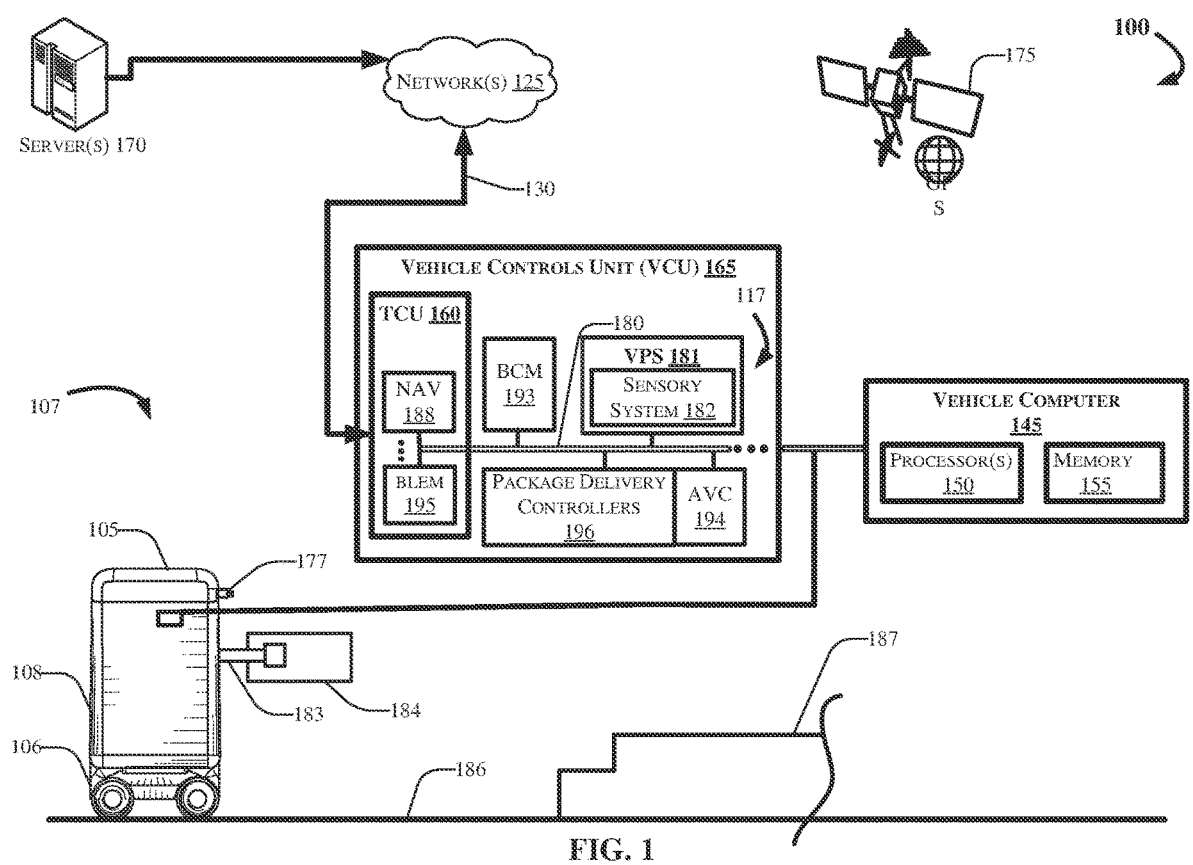
FIG. 1 depicts an example computing environment in which techniques and structures for providing the systems and methods disclosed herein may be implemented.

Disclosed is a software architecture for a modular autonomous robot. The systems and methods disclosed herein are configured and/or programmed to autonomously navigate a modular robotic vehicle chassis to onboard payload to be delivered, reach a delivery destination, and deliver the payload at a target destination.

According to an embodiment, the modular robotic system architecture distributes software models between a base platform of the robot and an interchangeable module disposed on an upper portion of the autonomous vehicle, referred to herein as a tophat of the robot. The tophat is customizable to cargo characteristics such as payload volume, weight, and size, and may be removably installed on a robot chassis according to expected cargo needs, delivery conditions, and environmental conditions, among other factors.

In one or more embodiments, the tophat is customizable to take advantage of a higher vantage point on the robot chassis to sense the surroundings and environmental conditions, and includes onboard controller configured and/or programmed to control package loading and unloading mechanisms that can include a package transfer boom (telescoping, gripping, etc.), a cargo displacement mechanisms and conveyors, and sensory devices to perform cargo delivery functions responsive to loading and unloading requests received from the robot chassis base controller.

In one or more embodiments, the modular robotic system includes a base module disposed with the customizable tophat module. The base includes a vehicle conveyance and power system that provide navigation and vehicle motion control, vehicle navigation, and cargo management control by issues loading and unloading command control to the tophat, and manages package transition from the tophat for cargo onboarding and offboarding actions.

According to one or more embodiments, the base may generate a request that the tophat unloads the package responsive to determining that the robot has arrived at a delivery location (e.g., a target destination). In one aspect, tophat may include an edge computing system configured and/or programmed to monitor data and commence an unloading process. The tophat may further include one or more sensory devices configured to obtain sensory data usable by the edge computing system to detect an optimal location to unload packages and determine if any obstructions are in the pathway to the target destination.

In some aspects, the tophat may detect a status of a ramp/conveyor belt disposed on the chassis base of the autonomous vehicle, where the edge computing system may determine the ramp/conveyor is ready to deploy for payload unfolding. The edge computing system may cause the unloading mechanism to actuate the unloading mechanism (e.g., the ramp/conveyor belt).

According to another aspect, the base of the autonomous vehicle may determine that the vehicle needs to reposition the vehicle to a position that assists the unloading operation. Responsive to determining that one or more sensory devices disposed in the base are unable to generate sensory data covering a sufficient area proximate to the robotic vehicle, such that the base computing platform may utilize the sensory data to create motion commands, the base may leverage query the edge computing system disposed in the tophat module to obtain tophat sensor data as well. Responsive to determining that the edge computing system does not have access to sensory data sufficient for the inquiry, the base may utilize only sensory data generated by the base sensory devices, which may conserve vehicle battery resources.

According to another embodiment, the base may be configured and/or programmed to balance the tophat module using one or more sensory devices disposed on the tophat module, such as an inertial measurement unit (IMU). For example, the tophat may use its sensors to estimate pose, and if balancing is required, the tophat may request that the base actuate balancing actuators. Based on the tophat request, the base may determine how the actuators should be adjusted to provide balance to the robot.

In some embodiments, the base module conveyance system may include tank treads for navigating stairs or extreme inclines. In this embodiment, a motion management controller disposed on the mase module may adjust tension of the tread to change the grip of the robot responsive to determining that tension may increase the traction and/or stability of the robotic vehicle as it climbs or descends a sharp incline surface or stairs.

The present disclosure may include distributed computing architecture that shares robotic vehicle control between a base module and an exchangeable tophat module. The tophat module edge computing system may optimize computational resources of the base module computing system, which conserves battery resources and increases computational speed of the vehicle. The disclosed system may maximize vehicle perception coverage for the onboard sensory devices due to a higher viewing aspect for sensory procedures, which can increase functionality and robustness of the autonomy of the vehicle, and increase flexibility of overall delivery capabilities. Moreover, modularizing the vehicle and providing an API interface for the tophat module may allow users to create tophat modules that are customized for unique delivery scenarios and cargo.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Self-driving delivery platforms may curb the high cost of last-mile and last 100-meter delivery of goods. To improve delivery efficiency, flexible, and robust package delivery using robots will be crucial due to increased shipping and logistics costs, and increased demand due to online purchasing for home and business delivery. Disclosed embodiments describe a distributed robot navigation and package delivery that accommodates varying payload and delivery environment conditions using a distributed control system onboard the robotic vehicle. An autonomous delivery robot can include a combination of infrared (IR) cameras, a triggered-flash light source, LiDAR, and ultrasonic sensors configured and/or programmed to facilitate autonomous operation. The autonomous delivery robot may utilize semantic segmentation on IR image streams to map semantics from a Red-Green-Blue (RGB) color image to a heat signature image obtained from IR sensor(s) onboard the vehicle. The robotic vehicle is configurable to include any robotic chassis, such as bipedal robot, a 4-legged robot, a wheeled robot, etc. The autonomous delivery robot may further include robotic arms, mechanical pulleys, booms, conveyors, and/or other mechanisms for loading, unloading, and performing other delivery tasks.

FIG. 1 depicts an example computing environment 100 that can include an autonomous modular robotic (AMR) vehicle 105. The AMR vehicle 105 can include a robotic vehicle computer 145, and a Vehicle Controls Unit (VCU) 165 that typically includes a plurality of electronic control units (ECUs) 117 disposed in communication with the robotic vehicle computer 145, which may communicate via one or more wireless connection(s) 130, and/or may connect with the AMR vehicle 105 directly using near field communication (NFC) protocols, Bluetooth® protocols, Wi-Fi, Ultra-Wide Band (UWB), and other possible data connection and sharing techniques. The VCU 165 may include components, and sensory devices disposed onboard the top module 108 and the bottom module 106.

Although described in the singular form, it should be appreciated that the robotic vehicle computer 145 comprises a plurality of controllers operating as an integrated and distributed control system for the AMR vehicle 105. For example, the AMR vehicle 105 may include one or more package delivery controllers 196, an autonomous vehicle controller (AVC) 194, among other computing systems. One benefit of the AMR vehicle 105 includes an interchangeable top and bottom module, where each respective module of the AMR vehicle 105 chassis is exchangeable, making unique configurations of vehicle hardware possible. The distributed control system refers to the AMR vehicle control system sharing computing and control tasks between the top module, which generally controls environmental operational control and payload loading and unloading responsibilities, and the bottom module, which manages navigation, drive, and other operational tasks. Accordingly, the distributed controllers onboard the AMR vehicle 105 are referred to herein individually and as a system (the robotic vehicle computer 145).

The AMR vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The robotic vehicle computer 145 may be or include an electronic vehicle controller, having one or more processor(s) 150 and memory 155. The robotic vehicle computer 145 may, in some example embodiments, be disposed in communication with a mobile device 120 (not shown in FIG. 1), and one or more server(s) 170. The server(s) 170 may be part of a cloud-based computing infrastructure, and may be associated with and/or include a Telematics Service Delivery Network (SDN) that provides digital data services to the AMR vehicle 105 and other vehicles (not shown in FIG. 1) that may be part of a robotic vehicle fleet (fleet not shown in FIG. 1).

Figure 5:
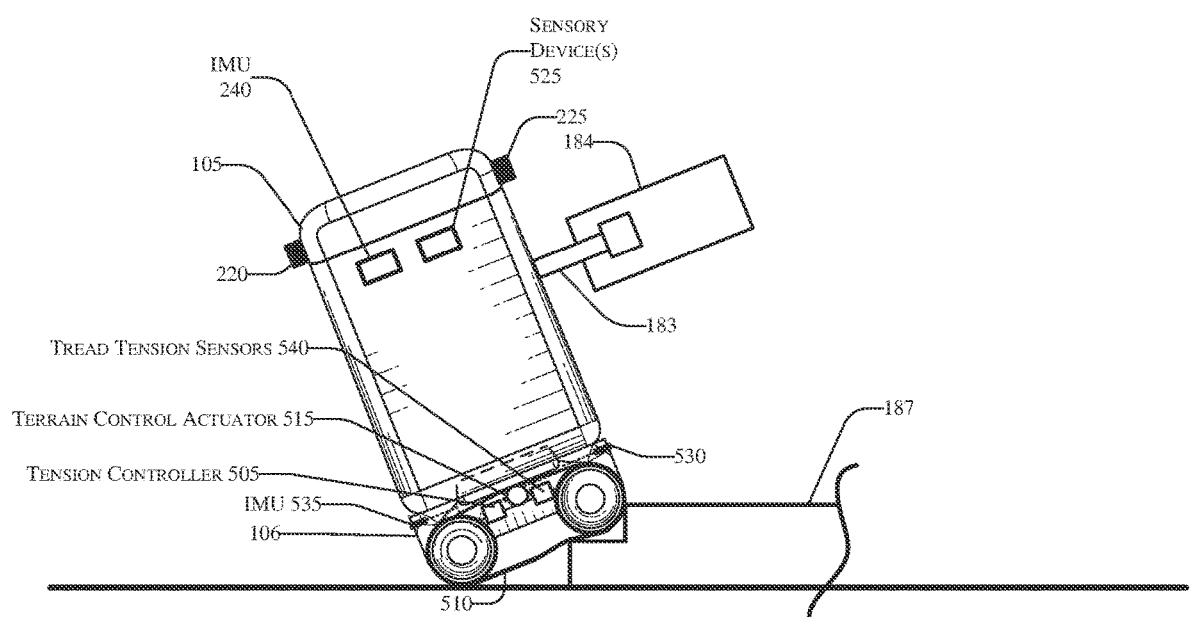
FIG. 5 depicts an AMR vehicle 105 configured with a tread in accordance with the present disclosure.

Although illustrated in disclosed embodiments as a four-wheeled vehicle and a track-driven vehicle in FIG. 5, the AMR vehicle 105 may take the form of another robot chassis such as, for example, a multi-wheeled vehicle, a bipedal robot, etc., and may be configured and/or programmed to include various types of robotic drive systems and powertrains.

According to embodiments of the present disclosure, the AMR vehicle system 107 may be configured and/or programmed to operate with a vehicle having a Level-4 or Level-5 AVC. An example AVC 194, is described in greater detail with respect to FIG. 7. Accordingly, the AMR vehicle system 107 may provide some aspects of human control to the AMR vehicle 105, when the vehicle is configured as an AV.

In some aspects, the mobile device (not shown) may communicate with the AMR vehicle 105 through the one or more wireless connection(s) 130, which may be encrypted and established between the mobile device and a Telematics Control Unit (TCU) 160. The mobile device may communicate with the TCU 160 using a wireless transmitter (not shown in FIG. 1) associated with the TCU 160 on the AMR vehicle 105. The transmitter may communicate with the mobile device using a wireless communication network such as, for example, the one or more network(s) 125. The wireless connection(s) 130 are depicted in FIG. 1 as communicating via the one or more network(s) 125, and via one or more wireless connection(s) 130 that can be direct connection(s) between the AMR vehicle 105 and the mobile device. The wireless connection(s) 130 may include various low-energy protocols, including, for example, Bluetooth®, BLE, or other Near Field Communication (NFC) protocols.

The network(s) 125 illustrate an example of communication infrastructure in which the connected devices discussed in various embodiments of this disclosure may communicate. The network(s) 125 may be and/or include the Internet, a private network, public network, or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth-Generation (5G), to name a few examples.

The robotic vehicle computer 145 may be installed in an interior compartment(s) of the AMR vehicle 105 (or elsewhere in the AMR vehicle 105) chassis, including the bottom module 106 and the top module 108, and operate as part of a distributed control system for the AMR vehicle system 107, in accordance with the disclosure. The robotic vehicle computer 145 may include one or more processor(s) 150.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. For example, the memory 155 may store unloading instruction sets, one or more instruction sets for changing a pose of the top module 108, instruction sets that associate particular AMR tread tensions with particular environmental characteristics such as steps, inclines, surface material, etc., and/or instruction sets for performing the tension adjustment. In other aspects, the instruction sets may include program code for loading and unloading cargo, operation of the unloading and loading/unloading mechanism(s) 183, and for identifying and characterizing cargo during transport. The memory 155 may be a non-transitory computer-readable memory storing a nighttime package delivery program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The VCU 165 may share a power bus (not shown in FIG. 1) with the robotic vehicle computer 145, and may be configured and/or programmed to coordinate the data between the AMR vehicle 105 systems, connected servers (e.g., the server(s) 170), and other vehicles, such as a transport and mobile warehouse vehicle (not shown in FIG. 1) operating as part of a vehicle fleet. The VCU 165 can include or communicate with any combination of the ECUs 117, such as, for example, a Body Control Module (BCM) 193, and Package Delivery Controllers 196 configured and/or programmed to control the loading/unloading mechanism(s) 183. The VCU 165 may further include and/or communicate with a Vehicle Perception System (VPS) 181, having connectivity with and/or control of one or more vehicle sensory system(s) 182. In some aspects, the VCU 165 may control operational aspects of the AMR vehicle 105, and implement one or more instruction sets operational as part of the AMR vehicle system 107. The VPS 181 may be disposed in communication with a package delivery controllers 196.

The VPS 181 may include a LiDAR device, a sonar device, an IR camera, an RGB camera, an inertial measurement unit (IMU), and/or other sensing devices disposed onboard the vehicle, which may be used by the package delivery controllers 196 to sense vehicle location, generate a navigation map (not shown in FIG. 1), and navigate to the destination 187. The AMR vehicle 105 may generate the navigation map with or without using a prior high definition map, and may update the map, once created or accessed, with new information encountered during delivery operations.

The TCU 160 can be configured and/or programmed to provide vehicle connectivity to wireless computing systems onboard and offboard the AMR vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the AMR vehicle 105 and other systems, computers, and modules. The TCU 160 may be disposed in communication with the ECUs 117 by way of a bus 180. In some aspects, the TCU 160 may retrieve data and send data as a node in a Controller Area Network (CAN) bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault-tolerant CAN (up to 125 Kbps), which may, in some configurations, use a linear bus configuration. In some aspects, the ECUs 117 may communicate with a host computer (e.g., the robotic vehicle computer 145, the AMR vehicle system 107, and/or the server(s) 170, etc.), and may also communicate with one another without the necessity of a host computer. The bus 180 may connect the ECUs 117 with the robotic vehicle computer 145 such that the robotic vehicle computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human teleoperators, inputs from the AVC 194, the AMR vehicle system 107, and/or via wireless signal inputs received via the wireless connection(s) 130 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks, access control, and various comfort controls. The BCM 193 may also operate as a gateway for bus and network interfaces to interact with remote ECUs (not shown in FIG. 1). The BCM 193 may further include robot power management circuitry that can control power distribution from a power supply (not shown in FIG. 1) to AMR vehicle 105 components.

The BCM 193 may coordinate any one or more functions from a wide range of vehicle functionality, including energy management systems, alarms, vehicle immobilizers, driver and rider access authorization systems, and other functionality. In other aspects, the BCM 193 may control auxiliary equipment functionality, and/or be responsible for integration of such functionality.

The computing system architecture of the robotic vehicle computer 145, VCU 165, and/or the AMR vehicle system 107 may omit certain computing modules. It should be readily understood that the computing environment depicted in FIG. 1 is an example of a possible implementation according to the present disclosure, and thus, it should not be considered limiting or exclusive.

The sensory systems 182 may provide the sensory data obtained from the sensory system 182 responsive to an internal sensor request message. The sensory data may include information from various sensors where the sensor request message can include the sensor modality with which the respective sensor system(s) are to obtain the sensory data.

The sensory system 182 may include one or more camera sensor(s) 177, which may include thermal cameras, optical cameras, and/or a hybrid camera having optical, thermal, or other sensing capabilities. Thermal and/or infrared (IR) cameras may provide thermal information of objects within a frame of view of the camera(s), including, for example, a heat map figure of a subject in the camera frame. An optical camera may provide RGB and/or black-and-white image data of the target(s) and/or the robot operating environment within the camera frame. The camera sensor(s) 177 may further include static imaging, or provide a series of sampled data (e.g., a camera feed).

The sensory system 182 may further include an inertial measurement unit IMU (not shown in FIG. 1), which may include a gyroscope, an accelerometer, a magnetometer, or other inertial measurement device.

The sensory system 182 may further include one or more lighting systems such as, for example, a flash light source (not shown in FIG. 1), a high beam light source (not shown in FIG. 1), and the camera sensors 177. The flash light source 179 may include a flash device, similar to those used in photography for producing a flash of artificial light (typically $\frac{1}{1000}$ to $\frac{1}{200}$ of a second) at a color temperature of about 5500 K to illuminate a scene, and/or capture quickly moving objects or change the quality of light in the operating environment 100. Flash refers either to the flash of light itself or to the electronic flash unit (e.g., the flash light source 179) discharging the light. Flash units are commonly built directly into a camera. Some cameras allow separate flash units to be mounted via a standardized "accessory mount" bracket (a hot shoe).

The sensory system 182 may further include a high beam light source (not shown in FIG. 1), having a broad-beamed, high-intensity (e.g., 75-100 lumens/Watt) artificial light. The high beam light source may be configured to produce a continuous supply of high-intensity light that lights the operating environment 100.

The sensory system 182 may include any number of sensors configured in the top module 108 and/or the bottom module 106. The sensory system 182 can connect with and/or include one or more inertial measurement units (IMUs), camera sensor(s), fingerprint sensor(s), and/or other sensor(s), and obtain biometric data usable for characterization of the sensor information for identification of biometric markers stored in a secure biometric data vault (not shown in FIG. 1) onboard the AMR vehicle 105, and to obtain environmental data for providing driver assistance features. For example, the AMR vehicle system 107 may provide cargo delivery only to authenticated delivery recipients that may be identified using biometric authentication methods based on sensory information from the sensory system 182. The package delivery controllers 196 may be obtained from the sensory system 182, sensory data that can include external sensor response signal(s) and internal sensor response signal(s) via a sensor I/O module (not shown in FIG. 1).

The sensory system 182 may further include camera sensor(s) such as, for example, thermal cameras, optical cameras, and/or a hybrid camera having optical, thermal, or other sensing capabilities. Thermal cameras may provide thermal information of objects within a frame of view of the camera(s), including, for example, a heat map figure of a subject in the camera frame. An optical camera may provide a color and/or black-and-white image data of the target(s) within the camera frame. The camera sensor(s) may further include static imaging, or provide a series of sampled data (e.g., a camera feed). The IMU(s) included as part of the VPS 181 may include a gyroscope, an accelerometer, a magnetometer, or other inertial measurement devices.

The package delivery controllers 196 may include program code and hardware configured and/or programmed for obtaining images and video feed via the VPS 181, and performing semantic segmentation using IR thermal signatures, RGB images, and combinations of RGB and IR thermal imaging obtained from the sensory system 182. Although depicted as a separate component with respect to the robot vehicle computer 145, it should be appreciated that any one or more of the ECUs 117 may be integrated with and/or include the robot vehicle computer 145.

The AMR vehicle system 107 may be configured and/or programmed as a framework for robot operations for package delivery. The sensors and computation onboard the AMR vehicle 105 processes environmental data and navigates on sidewalks and other paths. The AMR vehicle system 107 may operate independently using the AVC 194 and may receive control signals from another offboard computing system (not shown in FIG. 1) via the TCU 160 when connected remotely with a remote terminal via the network(s) 125.

The AMR vehicle 105 can deliver payload 184 from a central hub such as a mobile warehouse or delivery vehicle (not shown in FIG. 1) to a destination 187 at which the payload 184 is to be delivered by autonomous operation to provide navigation instructions for the AMR vehicle 105 along a vehicle path 186. Although depicted in FIG. 1 as having a four-wheeled chassis, it should be appreciated that the AMR vehicle system 107 may be configured and/or programmed to operate within a geo-fenced area (e.g., a city block, a neighborhood, a city or town, etc., not shown in FIG. 1) and can be adapted to various robot types having similar features but not depicted herein (including, for example, omni-directional wheeled robots, legged robots, etc.). More particularly, it is contemplated that the distributed robot control system may be adapted to alternative chassis designs using a modular top module (a tophat) connectable with a base module having an alternative structural and/or drive design, where the base portion and top module distribute computing tasks respectively based on the payload being delivered.

Figure 2:
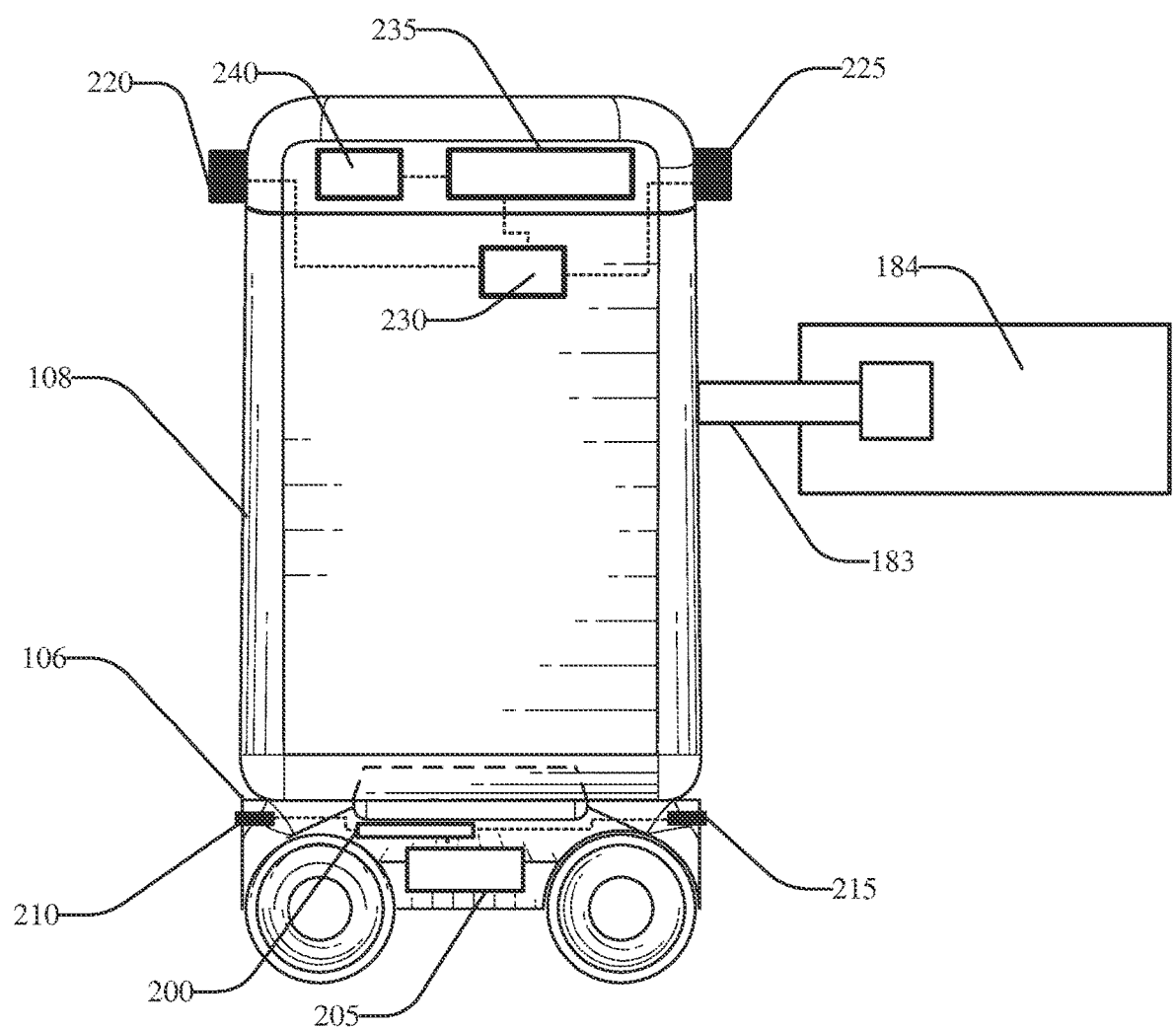
FIG. 2 depicts an autonomous robotic vehicle as it delivers cargo held by the unloading loading/unloading mechanisms in accordance with the present disclosure.

FIG. 2 depicts the AMR vehicle 105 as it delivers the 184 held by the unloading loading/unloading mechanisms. As explained in greater detail below, the AMR vehicle 105 may include a distributed sensory system 182 (depicted in FIG. 1) that may be distributed in the top module 108 and the bottom module 106. The top module 108 is removable from the bottom module 106 such that the AMR vehicle 105 is customizable for various sizes of payload 184, and/or terrain on which the AMR vehicle 105 will travel.

The bottom module 106 is generally responsible navigational control of the AMR vehicle 105, and may include battery and/or other power resource 205 that may power vehicle actuator(s). A bottom module controller 200 may provide navigational and computational governance to the vehicle control systems, acting as the master controller that coordinates slave controllers such as a top module controller 230.

The top module controller 230 may generally be responsible for package delivery and manipulation of the top module by issuing commands to the bottom module 106 responsive to determining environmental conditions and operational conditions that indicate changing vehicle pose, package/cargo orientation, destination, or travel situations requiring vehicle adjustment, and other package delivery tasks such as loading, unloading, etc.

The top module controller 230 may communicate with sensory devices disposed on the top module 108 that may include, for example, depth cameras 220 and 225, LiDAR, RADAR, etc.

The bottom module controller 200 may operatively connect with one or more sensory devices, such as LiDAR sensors 215, RADAR devices 210, and/or other sensory devices described with respect to embodiments below.

Figure 3:
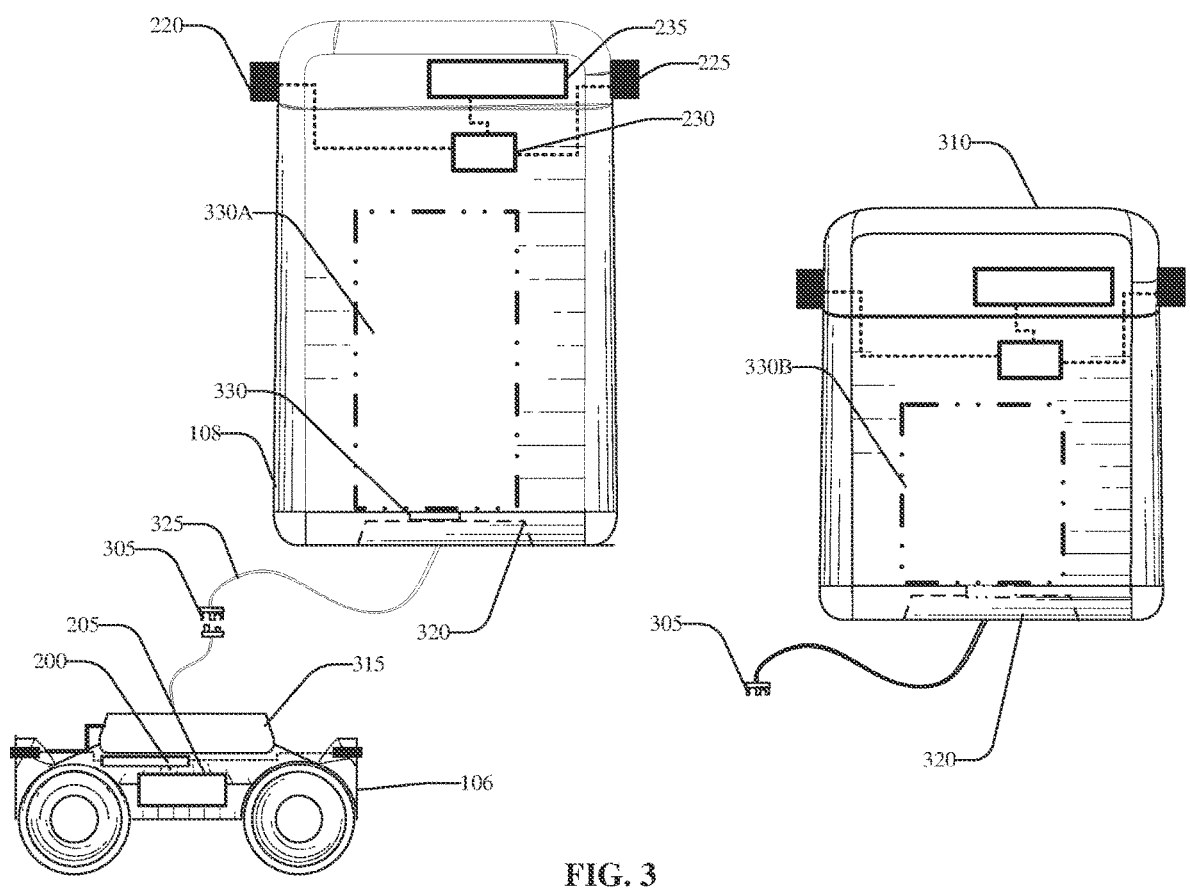
FIG. 3 depicts the AMR vehicle of FIG. 2 with the top module displaced from an exchangeable bottom in accordance with the present disclosure.

FIG. 3 depicts the AMR vehicle 105 with the top module 108 displaced from an exchangeable bottom module (e.g., one example bottom module 106 is shown in FIG. 3), in accordance with one or more embodiments. It should be appreciated, however, that any other configurations of bottom modules having another sensory set, drive configuration, etc., is contemplated herein, and the depicted configuration is not meant to be exclusive or limiting.

The bottom module 106 and the top module 108 may share a standardized interface 305. The standardized interface 305 connects the bottom module 106 with one or more top modules such as the top module 108, or a second top module 310, having a hardware and/or sensory configuration that differs from the top module 108. The connecting features may include any number of securing mechanisms such as an extrusion feature 315 configured to interface physically with a mating feature 320 in the top module(s) that it connects with. The mating feature 320 and extrusion feature 315, although shown as a tapered block shape, may be any form or mechanism to removably connect the top modules to the mating bottom modules. The connecting features may provide a physical interface for the AMR vehicle 105, provide secure connections to provide flexibility of interchanging the bottom module 106 with one or more top modules (e.g., the top module 108), and vice versa.

To facilitate the interchangeability of the bottom module 106 and various connectable configurations of top modules (e.g., 108 being one possible configuration), the AMR vehicle 105 may utilize a standardized interface 305 for physically and communicatively connecting the bottom module 106 and top module 108 (shown in greater detail with respect to FIG. 3). Although depicted as connecting via a flexible wire 325, it should be appreciated that any wiring and hardware configuration that provides repeatable and secure connections for electrical communication, data communication, and physical communication between the top and bottom modules is possible, and such possibilities are contemplated herein.

By allowing for interchangeability between top and bottom modules, the AMR vehicle 105 may accommodate various sized and configured cargo, as illustrated with two different package sizes 330A and 330B. The AMR vehicle system 107 may distribute computational and control between the bottom module 106 and the top module 108 to navigate the AMR vehicle 105 through a variety of environmental conditions and payload types with the least amount of wasted time, battery power, and with a greater degree of navigational flexibility as compared to conventional delivery robots having a single chassis configuration.

For example, the bottom module 106 may include one or more weight sensors 330 such as piezoelectric sensory devices or other mechanisms that may inform the bottom module controller of a cargo weight associated with loaded packages (e.g., 330A, 330B), and control aspects of vehicle operation that may reduce power consumption and increase vehicle stability. The top module controller 230 may receive power from an independent top module battery 235. The top module battery may also provide power to one or more top module unloading devices via top module controller 230. The unloading top module controller 230 may power and control one or more unloading mechanisms (not shown in FIG. 3) such as, for example, a boom, a conveyor, a robotic arm, or other devices. The top module controller 230 may be responsible for loading, unloading, and robot vision tasks, as it shares operational responsibility with the bottom module controller 200.

The bottom module controller 200 may be responsible for managing motion for navigating the AMR vehicle 105 to the target destination using onboard sensory data and the TCU 160 (as shown in FIG. 1) to detect obstacles such as steps or other features using the sensory devices in the VPS 181. The VPS 181 may include sensory devices in the top module 108 and/or the bottom module 106.

Figure 4:
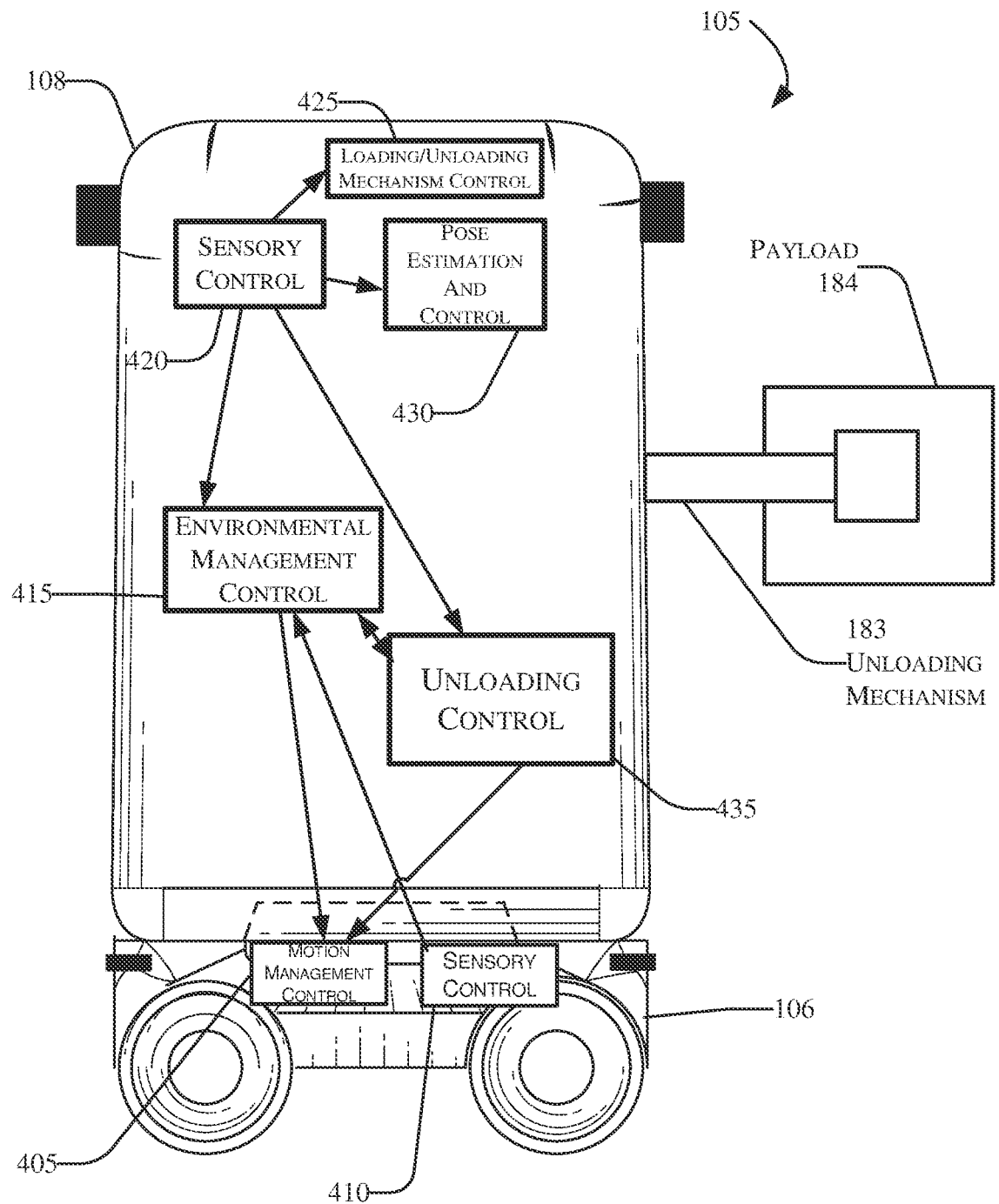
FIG. 4 depicts the AMR vehicle 105 from the standpoint of functional control, illustrated as functional control blocks, in accordance with the present disclosure.

FIG. 4 depicts the AMR vehicle 105 from the standpoint of functional control, illustrated as functional control blocks, in accordance with one or more embodiments. The functional control blocks illustrate aspects of AMR vehicle control that may be managed by respective portions of vehicle controllers in the top module 108 and the bottom module 106.

For example, the AMR vehicle 105 is depicted in FIG. 4, showing the bottom module 106 with functional blocks that include a motion management control function 405 and a sensory control function 410. Accordingly, the bottom module 106 may provide motion commands based on sensory input received and/or shared from the sensory devices disposed onboard the AMR vehicle 105. The bottom module may send and receive data to and receive data from the environment management control function 415 (e.g., to the top module controller 230, as shown in FIGS. 2 and 3). For example, the bottom module 106 may receive sensory data from the sensory control function 420, the unloading control function 435, and/or the pose estimation and control function 430, which may be independently and/or collectively managed by the top module 108. The bottom module 106 may receive and/or request sensory and control instruction sets from the top module 107, which may responsively the control information. Instructions for operation of the top module may also be sent to the environmental management control function, which is a primary responsibility of the top module controller 230.

The top module controller 230 (depicted in FIG. 2) may perform tasks such as environmental management control for environmental characteristics, such as weather, terrain, obstacle detection (using viewing angles that are higher than those available to the bottom module), and manage pose estimation and control for the AMR vehicle 105. The top module 108 may also be responsible (that is, provide sensory and operational control) for loading and unloading mechanism(s) via the loading/unloading mechanism control function 425.

Distributed sensory and robotic control provides flexibility and computational efficiency for navigating various terrain and accommodating a wide variety of payloads, and for accommodating a wide variety of onload and offloading situations. For example, the pose estimation and control function 430 (described with respect to FIG. 4) may perform top module balancing during delivery operations, while the bottom module controller performs navigation and chassis control using instructions and data received from the top module 108. For example, the pose estimation and the environmental management control function 415 (as shown in FIG. 4) may receive sensory control information from the sensory control function 420 and estimate top module pose that can include balancing, orientation, and shifting during operation. Responsive to determining that balancing or rebalancing is necessary due to environmental or operational characteristics such as a steep incline/decline, etc., the pose estimation and control function 430 may cause the environmental management control to communicate a rebalancing instruction set to the bottom module controller, which may actuate top module balancing actuators (not shown in FIG. 4) that cause the orientation and balance of the top module to compensate for the environmental characteristics causing unbalance. The bottom module controller may also issue motion commands that affect acceleration/deceleration of the vehicle chassis, and/or adjust vehicle configuration for tread tension, individual wheel torque, rotational speed, etc.

According to other aspects, the bottom module 106 may determine motion commands that can ensure packages are delivered without harming the products in the payload. For example, the top module 108 may provide one or more commands to the bottom module 106 that cause the AMR vehicle 105 to move from a first position, where the loading/unloading mechanisms disposed on the top module 108 may not be able to reach the target destination with the payload. The instruction set returned to the bottom module 106 may provide a command that causes the bottom module controller to change position from a first position to a second position.

In an example embodiment, once the AMR vehicle 105 arrives at a destination, the bottom module 106 may request from the top module that the system begins unloading. Accordingly, the top module may use one or more sensors such as a camera, an ultrasonic sensor, a pressure sensor, and/or other sensory devices to unload the payload 184. For example, the top module 108 may receive a command from the bottom module 106 to begin unloading. The top module 108 may cause the loading/unloading mechanism control (e.g., 183, which may be any number of mechanisms, such as robotic arms, claws, conveyors, boom and wench configurations, etc.) to function to unload the payload 184 from the AMR vehicle 105.

In other aspects, the top module 108 may be further responsible for balancing the AMR vehicle by determining vehicle poses that would indicate an unbalanced posture due to terrain, loaded cargo, or both.

FIG. 5 depicts an AMR vehicle 105 configured with a tread 510, in accordance with one or more embodiments. In this embodiment, the bottom module 106 includes a plurality of sensory devices that may be, for example, tread tension sensor 540, one or more IMUS 240 (on the top module 108), bottom module IMUS 535, and/or other distributed bottom module sensory devices 530 such as LiDAR, RADAR, proximity sensory device(s) 525, etc., which may be respectively controlled by the top and bottom module controllers, and coordinated globally via the bottom module controller. The bottom module controller (not shown in FIG. 5) may utilize data received from the sensory devices 240, 525, 530, 535, etc., and may determine that the terrain requires a tread adjustment to navigate stairs, and may adjust a tension by issuing a command and/or instruction set to a tension controller 505. The tension controller 505 may cause the track drive belt tension actuator 515 to increase or decrease tread tension of a tread 510 to accommodate the terrain, and dynamically adjust the tension based on tension data received from one or more tread tension sensors.

Figure 6:
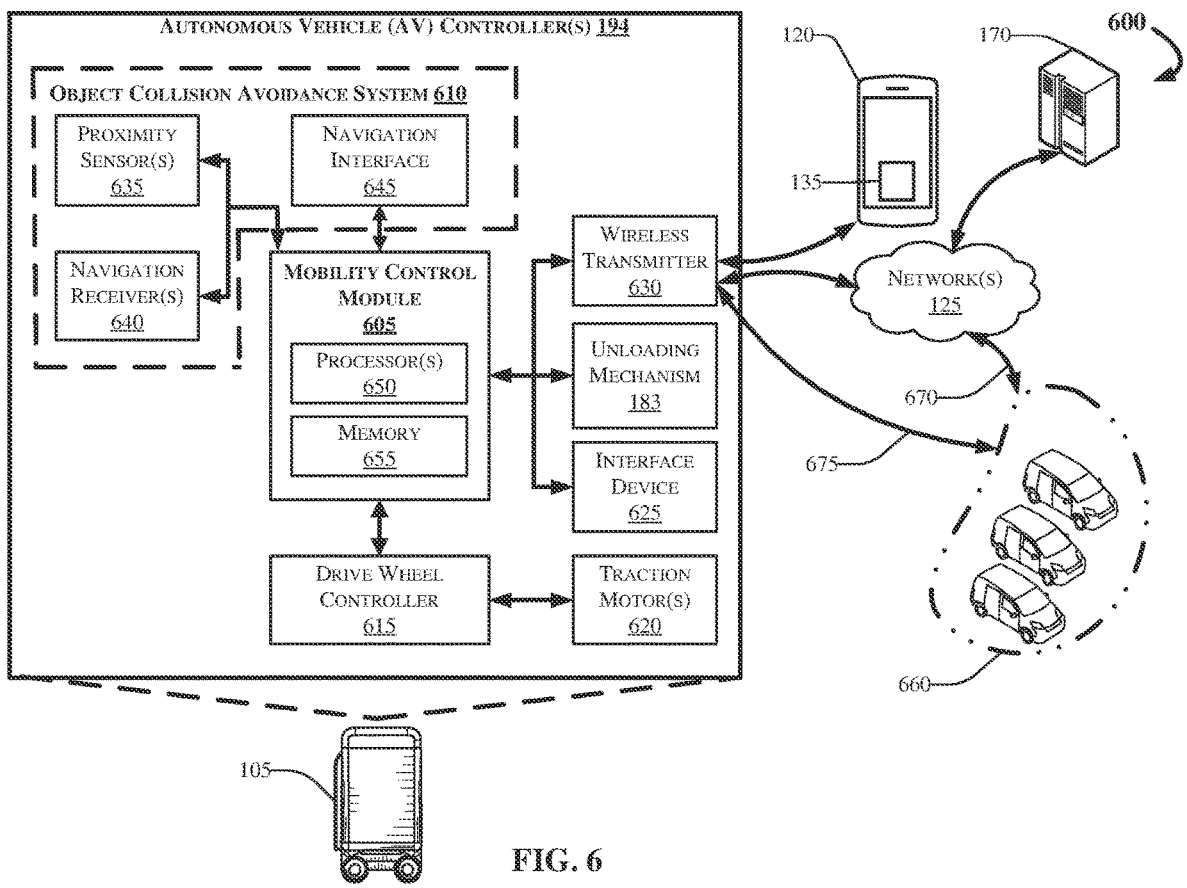
FIG. 6 depicts a functional schematic of an example control system that may for use in an autonomous vehicle in accordance with the present disclosure.

FIG. 6 depicts a block diagram 600 of an example AVC 194, in accordance with embodiments. The AV controller(s) 194 may include an object collision avoidance system 610 disposed in communication with a mobility control module 605. The object collision avoidance system 610 may perform object detection, navigation, and provide navigational interactive control features. The mobility control module 605 may be configured and/or programmed to receive data from the object collision avoidance system 610 to provide vehicle control.

The AV controller(s) 194 may be disposed in communication with and/or include the AMR vehicle system 107, in accordance with embodiments described herein. For example, the AV controller(s) 194 may perform aspects of vehicle navigation to the destination 187, identify obstacles and environmental characteristics, and provide instruction sets for changing the pose of the top module 108, changing the tread tension by commanding the track drive belt tension actuator 515 (shown in FIG. 5), receiving sensory device information, etc.

The mobility control module 605 may include one or more processor(s) 650, and a memory 655. The processor(s) 650 may be one or more commercially available general-purpose processor(s), such as a processor from the Intel® or ARM® architecture families. In some aspects, the mobility control module 605 may be implemented in a system on a chip (SoC) configuration, to include other system components such as RAM, flash storage, and I/O buses. Alternatively, mobility control module 605 can be implemented using purpose-built integrated circuits, or any other suitable technology now known or later developed. Moreover, the processor(s) 650 may be and/or include the robotic vehicle computer 145, and/or may be part of the processor(s) 150 referenced with respect to FIG. 1.

The memory 655 may include executable instructions implementing the basic functionality of the AV controller(s) 194 and a database of locations in geographic area. For example, the mobility control module 605 may connect with a drive wheel controller 615. The drive wheel controller 615 may communicate signals to one or more traction motor(s) 620, which may embody a drive mechanisms such as a brushless direct current (DC) motor, or another traction motor technology. The mobility control module 605 may cause the drive wheel controller 615 to transmit motive signals to the traction motor(s) 620 to the vehicle 105.

The AV controller(s) 194 may further include an interface device 625 having input and output surfaces (not shown in FIG. 6) for providing interactive access to users onboard the AV (e.g., the AMR vehicle 105). For example, the interface device 625 may include a touch screen interface surface configured and/or programmed to provide operational information such as power consumption information, battery health, battery level, etc. In some embodiments, the interface device 625 may further provide control features for controlling other motive aspects of the AMR vehicle 105, such as braking, acceleration, etc.

The interface device 625 may also communicate information to and from the navigation interface 645, and/or be integral with the navigation interface 645 such that they share a common touch screen interface. The interface device 625, either alone or in conjunction with the navigation interface 645, may provide control prompts to a human operator in instances where the AMR vehicle system 107 communicates with human supervisory devices and receives instructions for situations that may require human intervention.

The AMR vehicle 105 may be further configured and/or programmed to communicate information with other devices and vehicles using a wireless transmitter 630. The wireless transmitter 630 may communicate with one or more other vehicles in a vehicle fleet 660, and/or a central routing computer (e.g., the server(s) 170 as described with respect to FIG. 1) using a wireless communication network such as, for example, the network(s) 125. Although depicted as delivery vehicles, the vehicle fleet 660 may also and/or alternatively include a fleet of AMR vehicles similar or identical to the vehicle 105. The network(s) 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol.

The AV controller(s) 194 may be disposed in communication with the network(s) 125. The AMR vehicle 105 may communicate with one or more other vehicles in a fleet of vehicles 660 in various ways, including via an indirect communication channel 670 using the network(s) 125, and/or via any number of direct communication channels 675.

The object collision avoidance system 610 may provide route management and communication between one or more other vehicles in the fleet, and to the operator of the vehicle. The mobility control module 605 may receive navigational data from the navigation receiver(s) 640 and the proximity sensor(s) 635, determine a navigational path from a first location to a second location, and provide instructions to the drive wheel controller 615 for autonomous, semi-autonomous, and/or manual operation.

The navigation receiver(s) 640 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 640 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 6), locally-based navigation cues can include communication with one or more purpose-built location beacons (not shown in FIG. 6) placed throughout a geographic area. The navigation cues may enable an increased level of navigation precision and provide specific indicators for locations of various points of interest. In other aspects, the navigation receiver(s) 640 may include one or more navigation transceivers (not shown in FIG. 6) for communication with mobile network infrastructure for cell tower triangulation and use of known-location Wi-Fi hotspots. Any location technology now known or later developed that can provide a high precision location (e.g., preferably within a linear foot) can be useful as part of navigation receiver(s) 640.

The proximity sensor(s) 635 may work in connection with the navigation receiver(s) 640 to provide situational awareness to mobility control module 605 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 635 may alert the mobility control module 605 to the presence of sensed obstacles, and provide trajectory information to the mobility control module 605, where the trajectory information is indicative of moving objects or people that may interact with the AMR vehicle 105. The trajectory information may include one or more of a relative distance, a trajectory, a speed, a size approximation, a weight approximation, and/or other information that may indicate physical characteristics of a physical object or person.

The mobility control module 605 may be configured and/or programmed to aggregate information from navigation receiver(s) 640, such as current position and speed, along with sensed obstacles from the proximity sensor(s) 635, and interpret the aggregated information to compute a efficient path towards a destination such that the AMR vehicle 105 avoids collisions. Sensed obstacles can include other vehicles, pedestrians, animals, structures, curbs, and other random objects. In some implementations, the proximity sensor(s) 635 may be configured and/or programmed to determine the lateral dimensions of the path upon which the AMR vehicle 105 is traveling, e.g., determining relative distance from the side of a sidewalk or curb, to help aid mobility control module 605 in maintaining precise navigation on a particular path.

Figure 7:
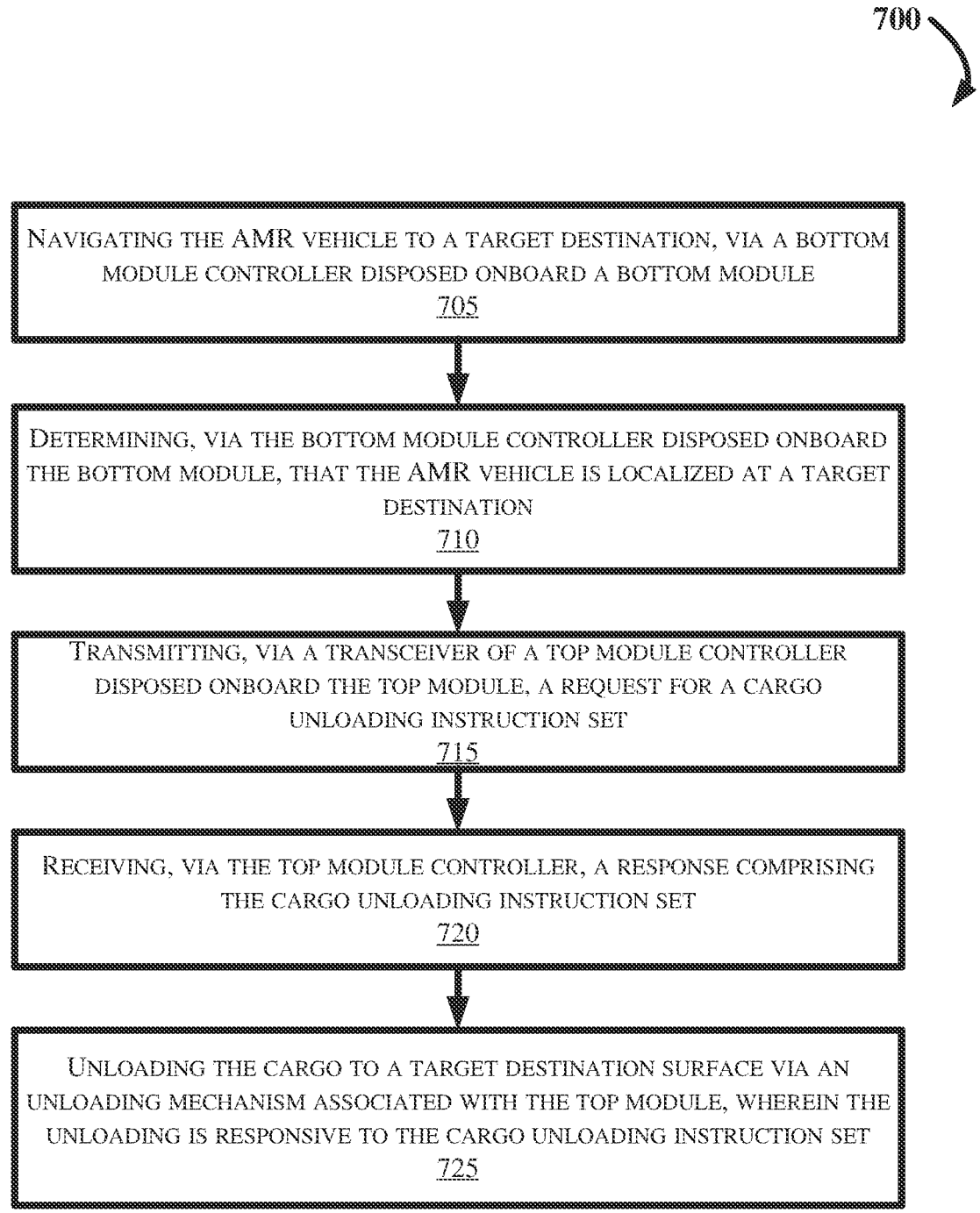
FIG. 7 depicts a flow diagram of an example method for controlling an autonomous modular robotic (AMR) vehicle in accordance with the present disclosure.

FIG. 7 is a flow diagram of an example method 700 for controlling an autonomous modular robotic (AMR) vehicle such as, for example, the AMR vehicle 105 described with respect to FIG. 1, according to the present disclosure. FIG. 7 may be described with continued reference to prior figures, including FIGS. 1-6. The following process is exemplary and not confined to the steps described hereafter. Moreover, alternative embodiments may include more or less steps that are shown or described herein, and may include these steps in a different order than the order described in the following example embodiments.

Referring first to FIG. 7, at step 705, the method 700 may commence with navigating the AMR vehicle to a target destination, via a bottom module controller disposed onboard a bottom module. This step may include determining, via a top module sensory device disposed in communication with the top module controller 230, a cargo weight, receiving, via the bottom module controller, the cargo weight, and changing, via the bottom module controller, a travel speed of the AMR vehicle based on the cargo weight.

In another aspect, this step may include determining, via a top module sensory device disposed in communication with the top module controller 230, pose of the top module, generating an instruction set for changing a pose of the top module based on an orientation of the AMR vehicle, receiving, via the bottom module controller, the instruction set for changing the pose of the top module and commanding, via the bottom module controller, an actuator disposed on the bottom module to change the pose of the top module such that the pose of the top module shifts from an unbalanced pose to a balanced pose. The adjustment step, which may be responsive to the instruction set for changing the pose, may include adjusting a pose of the top module using one or more top module actuators that lift, lower, shift, or otherwise manipulate the top module. The bottom module controller may execute this step responsive to determining that the travel path characteristic changed the top module pose from balanced to unbalanced, and/or responsive to receiving the instruction set for changing the pose from the top module controller 230.

The bottom module controller may determine a travel path characteristic, such as, for example, uneven terrain or terrain having a sharp incline or decline, stairs, obstacles along the route to the target destination, etc. For this step, the bottom module controller may receive from a sensory device disposed on the bottom module, a signal indicative of the travel path characteristic, and responsive to the signal indicative of the travel path characteristic, and generate an AMR tread tension adjustment command for adjusting tension of a track drive belt. Adjusting the tread tension of the track drive belt may increase traction, stability, or other operational characteristics as the AMR operates in the field. This step may further include changing, via a track drive belt tension actuator, the tension responsive to the AMR tread tension adjustment command.

According to another aspect, this step may include determining, via the bottom module controller; a travel path characteristic (such as those mentioned above or other characteristics that can affect vehicle travel to the target destination), receiving, from a sensory device disposed on the bottom module, a signal indicative of the travel path characteristic, generating, via the bottom module controller and responsive to the signal indicative of the travel path characteristic, an AMR tread tension adjustment command for adjusting tension of a track drive belt, and changing, via a track drive belt tension actuator, the tension responsive to the AMR tread tension adjustment command.

At step 710, the method 700 may further include determining, via the bottom module controller disposed onboard the bottom module, that the AMR vehicle is localized at a target destination. This step may include receiving one or more GPS signals, localizing using onboard sensory devices, Wi-Fi devices, BLEM, or other VCU components.

At step 715, the method 700 may further include transmitting, via a transceiver of a top module controller disposed onboard the top module, a request for a cargo unloading instruction set. This step may include receiving, via the top module controller, a response comprising the cargo unloading instruction set. The transceiver may connect using a hardwire connection or wireless connection with the bottom module and/or one or more offboard computing systems. The request for cargo unloading may include information indicative of a present location as observed by the top module. For example, the top module may utilize onboard top module sensory devices to observe the environment from a higher vantage point than the bottom module, determine that the AMR vehicle is localized at or proximate to the target destination, and transmit the request for the cargo unloading instruction set including localization information, environmental information, etc.

At step 720, the method may further include the step of receiving, via the top module controller, a response comprising the cargo unloading instruction set. The cargo unloading instruction set may include executable program code for actuating unloading mechanism(s) to transfer the cargo from the upper module to a surface on or near the target destination.

At step 725, the method 700 may further include unloading the cargo to a target destination surface via one or more loading/unloading mechanism(s) 183 associated with the top module, wherein the unloading is responsive to the cargo unloading instruction set. This step may include evaluating the payload drop-off characteristics from the upper module vantage point, which may have a respectively improved view of the work area at which the payload is to be unloaded. For example, if the drop-off area (e.g., the target destination) is at the top of a short stairway having just a couple of steps, the bottom module may not have an adequate view of the second or third step, or the top of the stairway on which the payload is to be delivered. However, the top module may have an advantage of elevation for the sensory devices onboard the top module to determine the relationship between the AVR chassis, unloading mechanism reach, and the AVR's ability to unload the payload given a present position respective to the drop off point.

In one aspect, this step may further include determining, via the top module controller, that the destination surface is unreachable by the unloading mechanism, sending, via the top module controller, a reposition instruction to the bottom module controller, changing a position of the AMR vehicle, via the bottom controller, responsive to the reposition instruction, determining, via a top module sensory device, that the target destination is reachable by the loading/unloading mechanism(s) 183, and unloading the cargo to a target destination surface via an unloading mechanism associated with the top module 108.

The present disclosure describes novel distributed computing architecture that distributes robotic vehicle control between a base module (e.g., bottom module) and an exchangeable tophat (e.g., top) module. The tophat module edge computing system may optimize computational resources of the base module computing system, which conserves battery resources and increases computational speed of the vehicle. The disclosed system may maximize vehicle perception coverage for the onboard sensory devices due to a higher viewing aspect for sensory procedures, which can increase functionality and robustness of the autonomy of the vehicle, and increase flexibility of overall delivery capabilities. Moreover, modularizing the vehicle and providing an API interface for the tophat module may allow users to create tophat modules that are customized for unique delivery scenarios and cargo.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling an autonomous modular robotic (AMR) vehicle comprising an exchangeable top module disposed onboard a robotic vehicle bottom module, the method comprising:
navigating the AMR vehicle to a target destination, via a bottom module controller disposed onboard the bottom module;
determining, via the bottom module controller disposed onboard the bottom module, that the AMR vehicle is localized at the target destination;

transmitting, via a transceiver of a top module controller disposed onboard the top module, a request for a cargo unloading instruction set;
receiving, via the top module controller, a response comprising the cargo unloading instruction set; and
unloading the cargo to a target destination surface via an unloading mechanism associated with the top module, wherein the unloading is responsive to the cargo unloading instruction set,
wherein navigating the AMR vehicle to the target destination further comprises:
determining, via a top module sensory device disposed in communication with the top module controller, pose of the top module;
generating an instruction set for changing a pose of the top module based on an orientation of the AMR vehicle;
receiving, via the bottom module controller, the instruction set for changing the pose of the top module; and
commanding, via the bottom module controller, an actuator disposed on the bottom module to change the pose of the top module such that the pose of the top module shifts from an unbalanced pose to a balanced pose.

2. The method according to claim 1, wherein navigating the AMR vehicle to the target destination further comprises:
determining, via a top module sensory device disposed in communication with the top module controller, a cargo weight;
receiving, via the bottom module controller, the cargo weight; and
changing, via the bottom module controller, a travel speed of the AMR vehicle based on the cargo weight.

3. The method according to claim 1, further comprising:
adjusting a pose of the top module responsive to determining that tea travel path characteristic changed the top module pose from balanced to unbalanced.

4. The method according to claim 1, further comprising:
determining, via the bottom module controller, a travel path characteristic;
receiving, from a sensory device disposed on the bottom module, a signal indicative of the travel path characteristic;
generating, via the bottom module controller and responsive to the signal indicative of the travel path characteristic, an AMR tread tension adjustment command for adjusting tension of a track drive belt; and
changing, via a track drive belt tension actuator, the tension responsive to the AMR tread tension adjustment command.

5. The method according to claim 1, wherein unloading the cargo to the target destination surface further comprises:
determining, via the top module controller, that the destination surface is unreachable by the unloading mechanism;
sending, via the top module controller, a reposition instruction to the bottom module controller;
changing a position of the AMR vehicle, via the bottom controller, responsive to the reposition instruction;
determining, via a top module sensory device, that the target destination is reachable by the unloading mechanism; and
unloading the cargo to the target destination surface via the unloading mechanism associated with the top module.

6. The method according to claim 1, wherein the unloading mechanism comprises one or more of a conveyor, a wench and boom, and a mechanical arm.

7. A distributed control system for an autonomous modular robot (AMR), vehicle comprising:
a top module processor disposed in communication with a lower module processor; and
memory for storing executable instructions of the top module processor and the lower module processor, the instructions executable to cause the top module processor and the lower module processor to:
navigate a bottom module, via the bottom module processor, the AMR vehicle to a target destination;
determine, via the bottom module processor, that the AMR vehicle is localized at the target destination;
transmit, via a transceiver disposed in communication with the top module processor, a request for a cargo unloading instruction set;
receive, via a top module processor, a response to a cargo unloading instruction set sent from the bottom module processor; and
unload the cargo, responsive to the cargo unloading instruction set, to a target destination surface via an unloading mechanism associated with the top module,
wherein the top module processor and the bottom module processor are further programmed to navigate the AMR vehicle to the target destination by executing the instructions to:
determine, via a top module sensory device disposed in communication with the top module controller, pose of the top module;
generate an instruction set for changing the pose of the top module based on an orientation of the AMR vehicle;
receive, via the bottom module controller, the instruction set for changing the pose of the top module; and
command, via the bottom module processor, an actuator disposed on the bottom module to change the pose of the top module such that the pose of the top module shifts from an unbalanced pose to a balanced pose.

8. The system according to claim 7, wherein the top module processor and the bottom module processor are further programmed to navigate the AMR vehicle by executing the instructions to:
determine, via a top module sensory device disposed in communication with the top module processor, a cargo weight;
receive, via the bottom module processor, the cargo weight; and
changing, via the bottom module processor, a travel speed of the AMR vehicle based on the cargo weight.

9. The system according to claim 7, wherein the top module processor and the bottom module processor are further programmed to execute the instructions to:
adjust a pose of the top module responsive to determining that a travel path characteristic changed the top module pose from balanced to unbalanced.

10. The system according to claim 7, wherein the top module processor and the bottom module processor are further programmed to execute the instructions to:
determine, via the bottom module processor; a travel path characteristic;
receive, from a sensory device disposed on the bottom module, a signal indicative of the travel path characteristic;

generate, via the bottom module processor and responsive to the signal indicative of the travel path characteristic, an AMR tread tension adjustment command for adjusting tension of a track drive belt; and change, via a track drive belt tension actuator, the tension responsive to the AMR tread tension adjustment command.

11. The system according to claim 7, wherein the top module processor and the bottom module processor are further programmed to execute the instructions to:

determine, via a top module processor, that the destination surface is unreachable by the unloading mechanism;

sending, via the top module processor, a reposition instruction to the bottom module processor;

change a position of the AMR, via the bottom module processor, responsive to the reposition instruction;

determine, via a top module sensory device, that the target destination is reachable by the unloading mechanism; and unloading the cargo to a target destination surface via the unloading mechanism associated with the top module.

12. The system according to claim 7, wherein the unloading mechanism comprises one or more of a conveyor, a wench and boom, and a mechanical arm.

* * * * *